United States Patent [19]

Cornell

[11] Patent Number: 5,005,848
[45] Date of Patent: Apr. 9, 1991

[54] MODULAR CABINET SUPPORT

[76] Inventor: Paul Cornell, 4426-97 St., South Edmonton, Alberta, Canada, T5E 5R9

[21] Appl. No.: 411,647

[22] Filed: Sep. 25, 1989

[30] Foreign Application Priority Data

Apr. 7, 1989 [CA] Canada .................................. 596111

[51] Int. Cl.⁵ .............................................. B62B 3/02
[52] U.S. Cl. ............................... 280/79.11; 108/56.1; 403/295
[58] Field of Search ..................... 280/79.11, 35, 47.13; 108/56.1, 56.3; 403/295, 172

[56] References Cited

U.S. PATENT DOCUMENTS

| | | | |
|---|---|---|---|
| 2,774,609 | 12/1956 | Winger | 280/79.11 |
| 3,331,613 | 7/1967 | Popelka | 280/35 |
| 3,558,152 | 1/1971 | Miles et al. | 280/79.11 |
| 3,977,800 | 8/1976 | Cassel | 403/172 |
| 4,082,470 | 4/1978 | Alberts | 403/295 |
| 4,305,677 | 12/1981 | Kowalski | 403/295 |

FOREIGN PATENT DOCUMENTS 3815990 2/1989 Fed. Rep. of Germany ... 280/79.11

Primary Examiner—David M. Mitchell
Attorney, Agent, or Firm—William R. Hinds

[57] ABSTRACT

In general, presently existing dollies are rigid structures which are not particularly suitable for supporting filing cabinets or the like to render them mobile. A relatively simple, yet strong trolley or dolly includes generally U-shaped, sideways opening brackets which are connected, in perpendicular relationship, to each other and to downwardly opening, C-shaped lightweight channel sections to define a rectangular frame. At least one bracket at each corner of the frame carries a wheel for rendering the dolly mobile.

8 Claims, 3 Drawing Sheets

MODULAR CABINET SUPPORT

BACKGROUND OF THE INVENTION

This invention relates to a dolly, and in particular to a modular dolly for filing cabinets.

While the device of the present invention is identified hereinafter as a "dolly", it will be appreciated that the device can be permanently mounted under filing cabinets to render the latter mobile, i.e. the term "dolly" is intended to have its conventional meaning, or to identify a cart or trolley.

In general, dollies of the type proposed by applicant, i.e. flat dollies for supporting filing cabinets or appliances are solid structures of fixed dimensions. A search of the patent literature discloses dollies which can be assembled and disassembled. Examples of such dollies are found in U.S. Pat. Nos. 2,774,609, which issued to R. C. Winger on Dec. 18, 1956 and 3,331,613, which issued to J. C. Popelka on Jul. 18, 1967. The Winger structure is relatively complicated, utilizing sides with dovetailed grooves which would result in high production costs. The Popelka device is a lightweight structure for use in the household, and consequently would not be particularly durable or suitable for heavy filing cabinets.

OBJECTS OF THE INVENTION

The object of the present invention is to provide a relatively simple, yet strong, lightweight modular dolly which can be used to support one or more filing cabinets, and which can readily be expanded to accommodate larger units or groups of filing cabinets.

BRIEF SUMMARY OF THE INVENTION

Accordingly, the present invention relates to a modular dolly comprising substantially U-shaped, sideways opening bracket means adapted to define a corder of a frame when two or more such bracket means are interconnected with the open ends of the bracket means opening away from and perpendicular to each other; wheel means rotatably mounted in one said bracket means for supporting the dolly; and elongated channel means extending between and connected to the bracket means to define the sides and ends of the dolly.

BRIEF DESCRIPTION OF THE DRAWINGS

The invention will be described in greater detail with reference to the accompanying drawing, which illustrates a preferred embodiment of the invention, and wherein.

DESCRIPTION OF THE PREFERRED EMBODIMENT(S)

Figure 1:
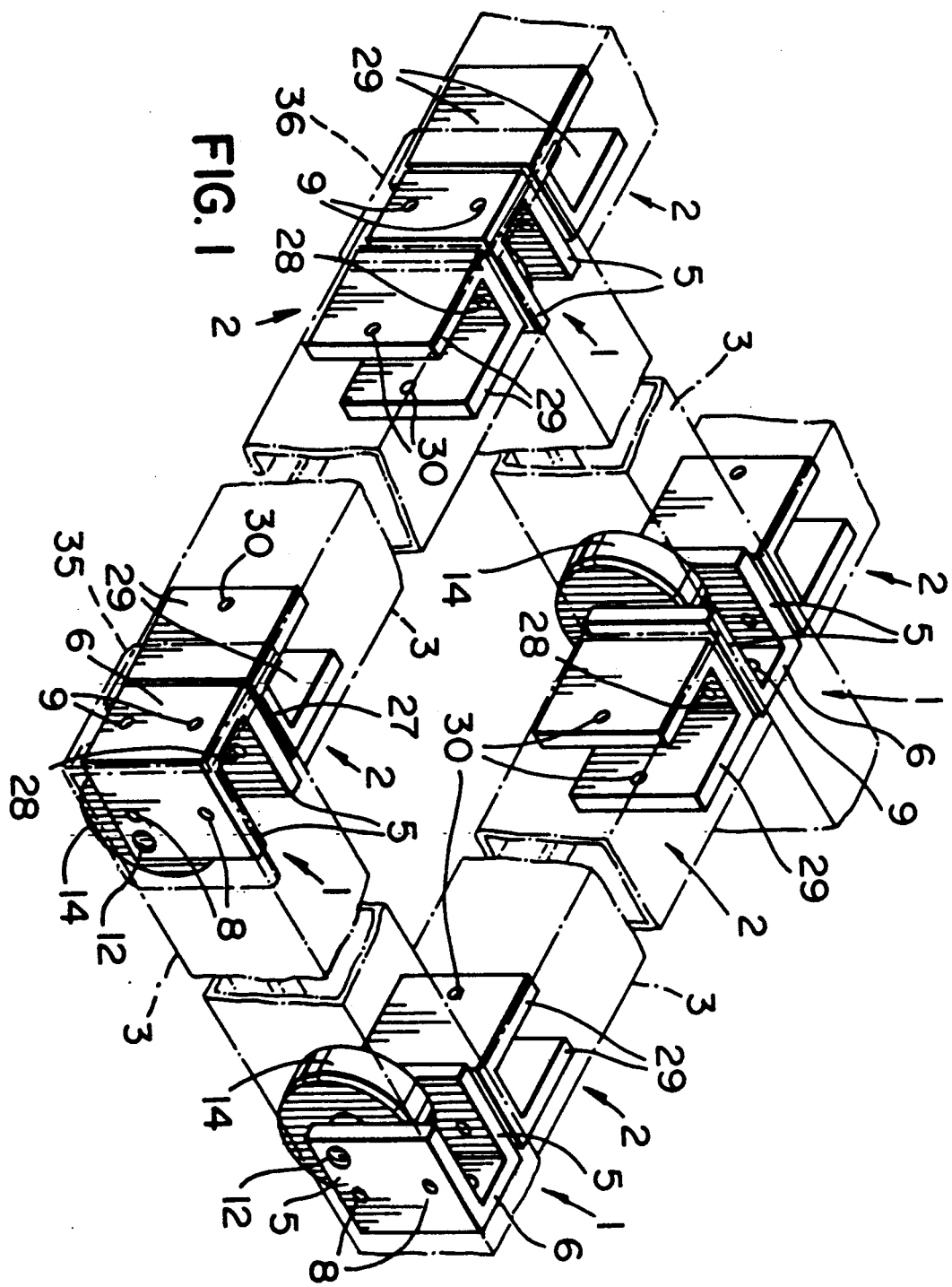
FIG. 1 is a schematic, perspective view from above of a portion of a dolly constructed in accordance with the present invention.

With reference to the drawings, the basic elements of the modular dolly of the present invention include U-shaped brackets generally indicated at 1 and 2, and channel elements 3 extending between such brackets 1 amd 2.

The bracket 1 is defined by a pair of parallel, spaced apart arms or sides 5, interconnected at one end by an end wall 6. Thus, the bracket 1 (like the bracket 2) is sideways opening, i.e. generally V-shaped when viewed from above or below, with a pair of rectangular sides 5 and one rectangular end 6. A pair of threaded openings 8 are provided in each side 5 for connecting the brackets 1 to brackets 2. Similarly, a pair of vertically aligned threaded holes 9 are provided in the end 6 of the bracket 1 for connecting the bracket 1 end-to-end to a similar bracket 1 or to a bracket 2. A pair of horizontally aligned openings 12 (FIG. 1) are provided in the side 5 for receiving a pin 13 which acts as an axle for a wheel 14. A hub 17 and a bearing 18 are provided between the axle and the wheel 14.

Figure 2:
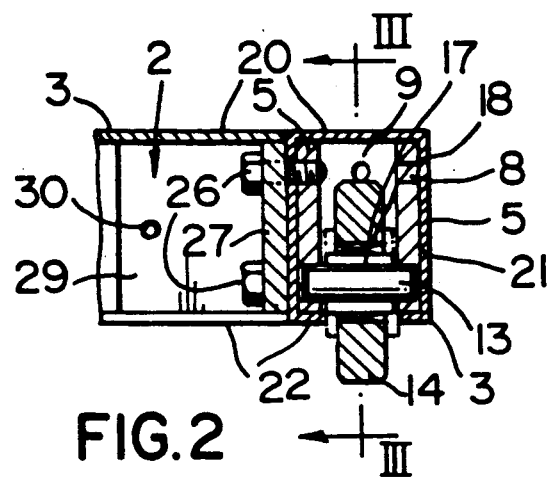
FIG. 2 is a cross section of one corner of the dolly of FIG. 1.
Figure 3:
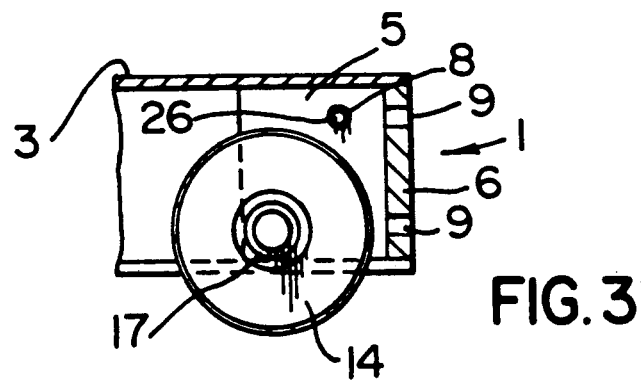
FIG. 3 is a cross section taken generally along line III—III of FIG. 2.
Figure 4:
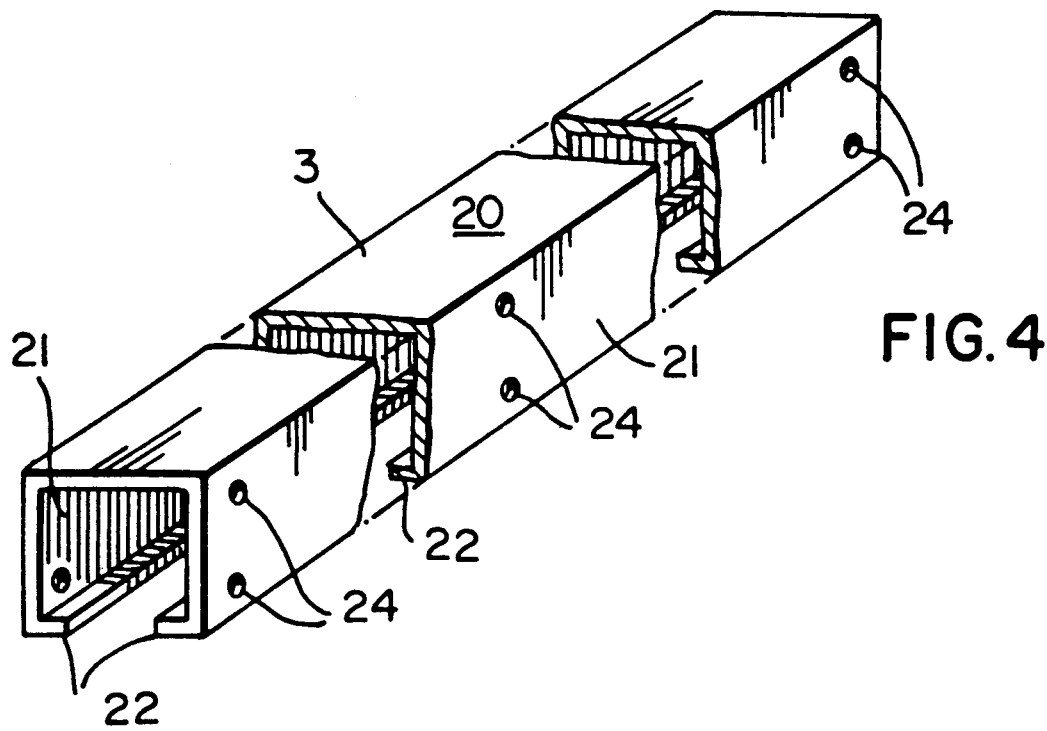
FIG. 4 is a sectioned, perspective view of a channel element used in the dolly of FIG. 1.

When assembling a dolly, a carriage rail in the form of an inverted, C-shaped channel element 3, is provided between two brackets 1. As best shown in FIG. 4, the channel element 3 is defined by an elongated section of channel of C-shaped cross section including a top wall 20, side walls 21 and inwardly extending bottom ledges or flanges 22. Thus, the channel element 3 opens downwardly. A pair of vertically aligned holes 24 are provided in each side wall 21 of the channel element 3 near each end and the center thereof. The holes 24 are threaded for receiving bolts 26 (FIGS. 2 and 3) for connecting the closed end 27 of a bracket 2 to the channel element 3 covering the bracket 1 and to the bracket 1 itself.

It will be appreciated from FIG. 1 that the channel elements 3 perpendicular to the brackets 1 do not have the same arrangement of holes 24 as the channel elements 3 extending between and overlapping the brackets 1. However, except for the arrangement of the bolt receiving holes, all of the channel elements 3 are identical.

The bracket 2 has the same configuration as the bracket 1, including the end wall 27 with holes 28 (one shown—FIG. 1) for receiving the bolts 26, and side walls 29. The side walls 29 are provided with holes 30 for receiving bolts 32 (FIG. 7) for connecting a channel element 3 to the brackets 2.

Figure 5:
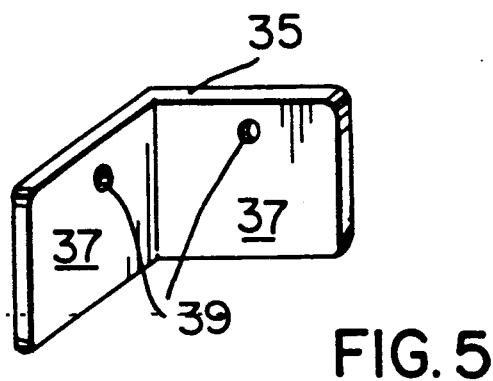
FIG. 5 is a perspective view from above of a corner retainer used in the dolly of FIG. 1.
Figure 6:
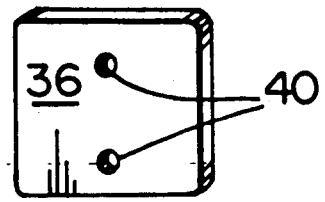
FIG. 6 is a perspective view from above of a side retainer used in the dolly of FIG. 1.

When the brackets 1 and 2, and the channel elements 3 are assembled to define a rectangular dolly, the stability of the dolly is increased by means of corner and straight retaining plates 35 and 36, respectively (FIGS. 1, 5 and 6, respectively). The corner plate 35 is merely an L-shaped plate, the arms 37 of which are sufficiently long to extend beyond the joints between the brackets 1 and 2 at corners of the dolly for preventing relative movement between such brackets 1 and 2. Each arm 37 of the plate 35 is provided with a hole 39 for receiving a bolt, which also extends into the uppermost hole 8 or 9 in the bracket 1 for mounting the retaining plate on the corner of the dolly. A pair of vertically aligned holes 40 are provided in the center of the straight retaining plate 36 for receiving bolts which extend into the holes 9 in the end of the bracket 1, when the bracket 1 is used between a pair of brackets 2 along one side of the dolly. As shown in FIG. 1, the ends of the plate 36 extend beyond the joint between the sides 5 of the bracket 1 and sides 29 of the bracket 2 at the closed end 27 thereof for stabilizing the dolly.

Due to the modular construction of the dolly according to the subject invention it will be appreciated that the dolly can be expanded both laterally and frontly in either direction to accommodate future expansion without the necessity of dismantling existing shelving and the cabinets that it supports.

Figure 7:
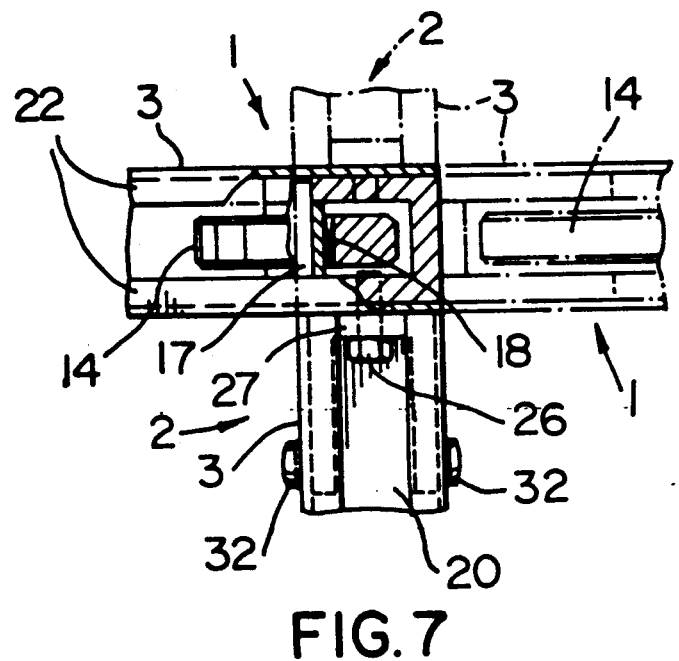
FIG. 7 is a partially sectioned view of an optional reinforcing structure for use under central areas of filing cabinets or at junctions between abutting filing cabinets.

With reference to FIG. 7, wheel-carrying brackets 1 can be interconnected end-to-end, with a pair of brackets 2 perpendicular thereto to define a cross-shaped reinforcing structure for use under central areas of filing cabinets or at junctions between abutting filing cabinets.

The basic elements of the dolly can be produced from a lightweight extruded aluminum alloy. The wheel is preferably formed of hard steel or of a relatively soft hub with a narrow annular rim of a hard steel.

Thus, there has been described a relatively simple modular dolly which can readily be assembled and disassembled and which can be modified to support units of different dimensions.

What I claim is:

1. A modular dolly having a dolly frame with an upper surface for supporting objects, the frame having at least one corner formed by a pair of interconnected bracket means, each bracket means being substantially U-shaped as viewed generally normal to the upper surface of the frame such that each bracket means includes a base end, two side arms and an open end opposite said base end, the base end of one said bracket means being interconnected with a side arm of the other bracket means such that the open ends open away from and perpendicular to each other; wheel means rotatably mounted in one said bracket means for supporting the dolly; and elongated channel means extending from and connected to each bracket means to define a side and an end of the dolly adjacent said corner.

2. A dolly according to claim 1, wherein said channel means includes a channel section which fits over one said bracket means at said corner of the dolly, and a portion thereof is sandwiched between the interconnected bracket means.

3. A dolly according to claim 2, wherein said channel means is C-shaped and downwardly opening is cross-section.

4. A dolly according to claim 1, wherein said channel means includes a plurality of channel sections and said bracket means includes a first, wheel carrying bracket for telescopically receiving one end of a first said channel section, and a second hollow bracket for telescopically receiving one end of a second channel section perpendicular to said first channel section, and first bolt means for connecting the base end of said second bracket to one channel arm of said first channel section at said one end thereof and to said first bracket to form a secure unit, with said arm of said first channel section interposed between the brackets.

5. A dolly according to claim 4, wherein said bracket means includes a third hollow bracket similar to said second hollow bracket for telescopically receiving one end of a third channel section, and second bolt means for connecting the base end of said third bracket to the other channel arm of said first channel section at said one end thereof in alignment with said second bracket.

6. A dolly according to claim 5, wherein said bracket means includes a fourth, wheel-carrying bracket similar to said first bracket for telescopically receiving one end of a fourth channel section, and third bolt means for connecting the base end of said fourth bracket to the base end of said first bracket to define a tandem wheel section of the dolly.

7. A dolly according to claim 4, including corner plate means for extending between outer arms of said first and second brackets for stabilizing a corner of the dolly defined by said brackets.

8. A dolly according to claim 5, including side plate means for connection to the base end of said first bracket in overlapping relationship with outer arms of said second and third brackets to stabilize a side of the dolly defined by said brackets.

* * * * *